Sept. 29, 1970     J. C. MOBLEY     3,531,136
GOLF CART AND CARRIER COMBINATION
Filed July 18, 1968    2 Sheets-Sheet 1

INVENTOR.
JOHN C. MOBLEY,
BY *Kimmel, Crowell & Weaver*
ATTORNEYS.

Sept. 29, 1970   J. C. MOBLEY   3,531,136
GOLF CART AND CARRIER COMBINATION
Filed July 18, 1968   2 Sheets-Sheet 2
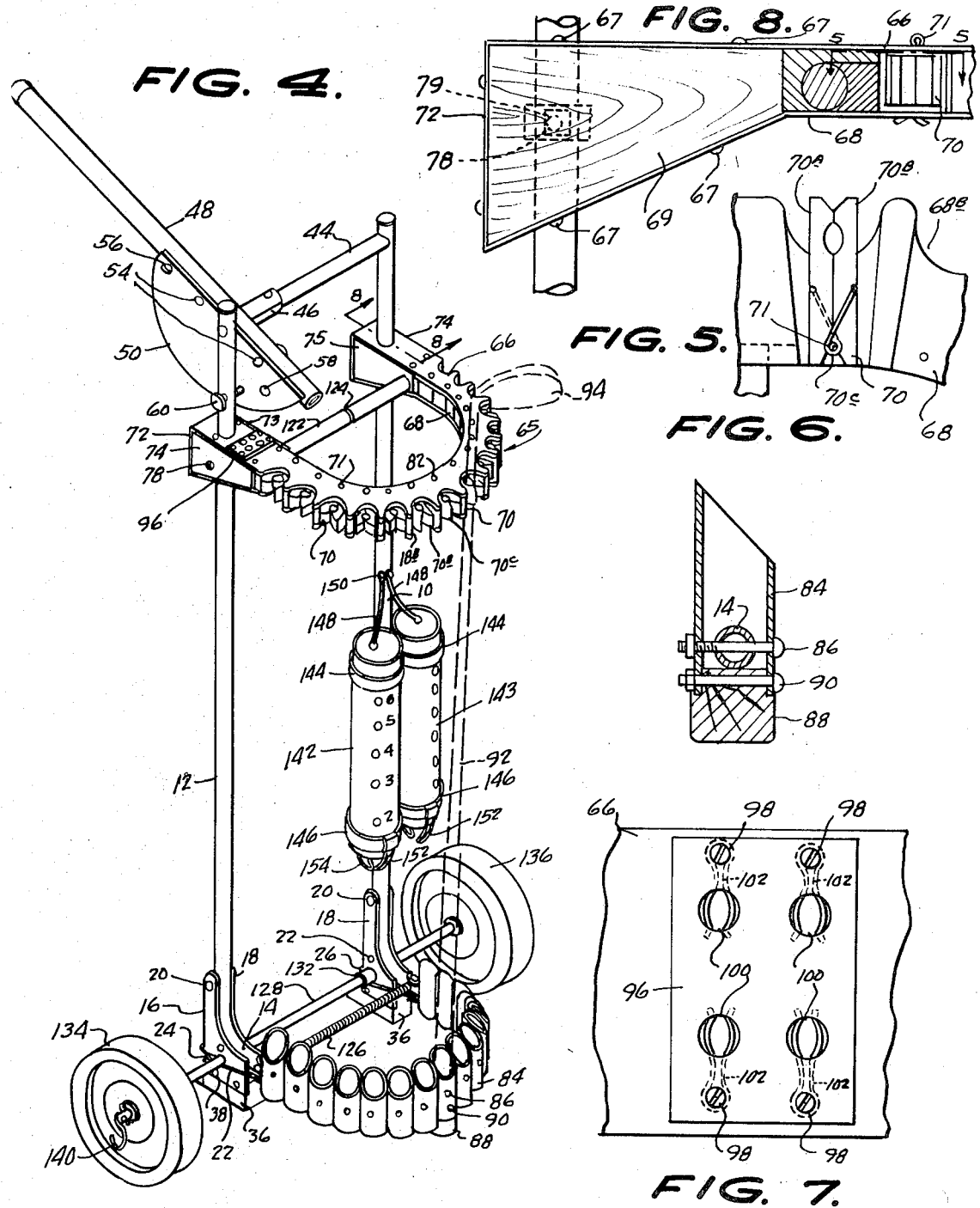
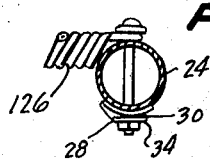
INVENTOR.
JOHN C. MOBLEY,
BY *Kimmel, Crowell & Weaver*
ATTORNEYS.

United States Patent Office 3,531,136
Patented Sept. 29, 1970

3,531,136
GOLF CART AND CARRIER COMBINATION
John C. Mobley, 130 Linden Ave.,
Portsmouth, Va. 23704
Filed July 18, 1968, Ser. No. 745,723
Int. Cl. A63b 55/08
U.S. Cl. 280—30
10 Claims

ABSTRACT OF THE DISCLOSURE

A combination carrier and cart for golf clubs, balls, tees and an umbrella, the cart having an elongate frame with means for selectively supporting a wheel and axle assembly longitudinally in the frame, and for releasably securing the axle transversely of the frame in such a manner that the frame to which the ball, tee, umbrella and club carriers are attached may be used as a carrier of the golf bag type or as a golf cart.

BACKGROUND OF THE INVENTION

Field of the invention

This invention relates to golf accessories in general and more particularly to golf bags and golf carts.

Description of the prior art

Golf bags or carriers are well known in the prior art. These carriers are generally elongate in configuration and are provided with a strap or other carrying means.

Golf carts are also known in the prior art. Such carts are generally fairly heavy and are provided with a pair of wheels for being drawn over the golf course by the user or the caddy.

In use, both golf bags or other carriers and golf carts have disadvantages. It is, generally, advisable to have a golf cart where long distances are being walked; on the other hand, it is sometimes more convenient to have a golf bag which is more compact and more easily handled on a crowded golf course.

A principal object of the present invention is to provide a combined carrier and cart for golf clubs and other golfing accessories which may be used either as a carrier or as a cart so as to take advantage of both constructions.

SUMMARY

Without intending to limit the scope of the invention there is herein disclosed a combined golf carrier and cart which has a pair of elongate parallel frame members secured by an offset curved portion to which a plurality of cups are attached for receiving the ends of a plurality of golf clubs and an umbrella tip. Near the free ends of the elongate frame members there is provided a U-shaped gripping assembly which includes a plurality of resilient grippers for securing the shafts of golf clubs. Thus, the golf clubs are held with the ends of the handles in the cup and are secured at intermediate points on the shafts by the grippers. Two golf ball holding units are secured to one of the elongate members, and each is provided with a resilient retainer at its lower end to permit removal of golf balls therefrom. A tee holder for resiliently securing tees to the cart is also provided. A collapsible handle is provided when the carrier is to be used as a cart. It is, accordingly, an object of this invention to provide an improved combined carrier and cart.

A further object of the invention is to provide an improved golf cart of light weight construction.

An additional object of the invention is the provision of a golf cart or carrier with novel golf ball container means.

Yet another object of the invention is the provision of a combined golf cart and carrier with a novel arrangement for holding tees.

Yet an additional object of the invention is the provision of a golf cart and carrier wherein a wheel assembly may selectively be secured in the carrier longitudinally thereof or secured laterally of the carrier to form a cart, or wherein the wheel assembly may be removed completely to lighten the load to be carried.

The specific disclosure shown in the drawings and described in the specification constitutes an object of the invention. Other objects will be apparent from the specification and from the drawings to which reference is made.

BRIEF DESCRIPTION OF THE DRAWINGS

FIG. 2A is a fragmentary detail transverse cross-sectional view, FIG. 2A being taken substantially on the vertical plane of line 2A—2A of FIG. 2, looking in the direction of the arrows.

FIG. 4 is a perspective view of the golf carrier of FIG. 1 shown with the wheel assembly secured in lateral position and the handle extended to form a golf cart.

FIG. 5 is a detail in partial cross section taken substantially along lines 5—5 of FIG. 8 showing the gripper for golf clubs.

FIG. 6 is a detail in cross section taken substantially along lines 6—6 of FIG. 2 showing one of the cups for the end of the golf club and a support for the cart or carrier.

FIG. 7 is a top plan view showing the tee retaining means in greater detail.

FIG. 8 is an enlarged fragmentary detail cross-sectional view, FIG. 8 being taken substantially on the vertical plane of line 8—8 of FIG. 4, looking in the direction of the arrows.

FIG. 9 is a top plan view, similar to FIG. 1, showing a modification of the frame extension for releasably receiving the shafts of golf clubs and the like.

DESCRIPTION OF THE PREFERRED EMBODIMENT

Reference is now made to the drawings wherein like numbers describe like constructions in the several views thereof.

Figure 2:
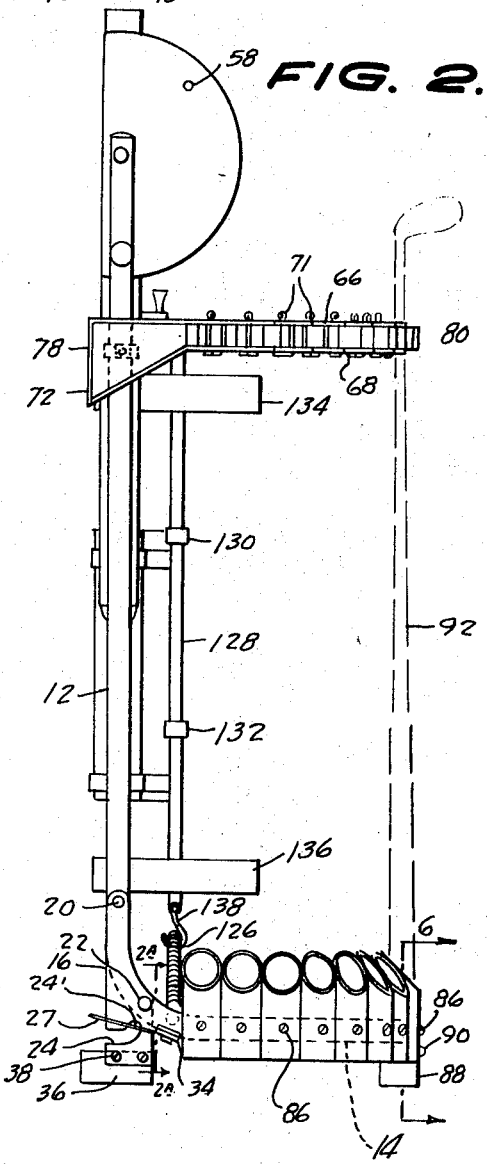
FIG. 2 is a side elevational view of the golf carrier of FIG. 1.
Figure 3:
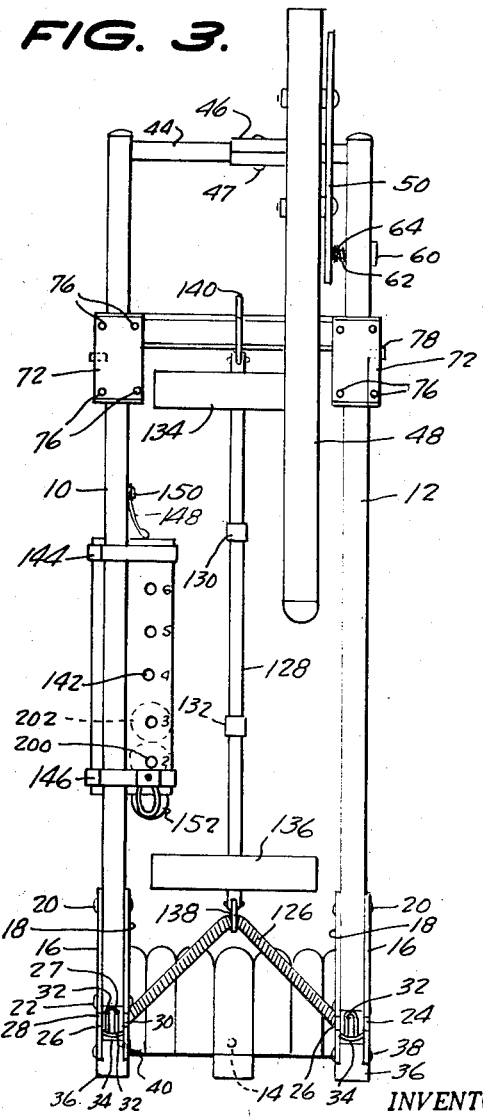
FIG. 3 is a rear elevational view of the golf carrier of FIG. 1 showing the handle thereof in collapsed position.

As best shown in FIGS. 2, 3 and 4, the carrier and cart combination of this invention comprises a pair of substantially parallel elongate frame members 10 and 12 secured at the bottom by an offset U shaped bight portion 14. The frame members 10 and 12 and the bight portion 14 are preferably of a single unitary tubular piece bent in the shape described and shown. To the bottom end of the frame members 10 and 12, a pair of wheel engaging brackets 16 and 18 are secured by bolts 20 and 22. The brackets 16, 18 are provided with slots 24 and 26 (see FIGS. 2 and 3) which extend inwardly from one of their respective side edges to terminate in centrally located upwardly extending substantially semi-circular lobes, one such lobe being shown in FIG. 2 and being designated by reference numeral 24′. As will be described in greater detail and as shown in FIG. 4, these slots are adapted to receive an axle of a wheel assembly.

As shown in FIGS. 2, 2A, and 3, a substantially U-shaped resilient retaining spring 27 is provided with arms 28 and 30 which are connected together by a bight portion 32. The arms 28, 30 of each spring 27 are connected to the bottom of the member 14 and hence to the one end of each of the elongate frame members 10, 12 by fastener means 34 shown in detail in FIG. 2A.

The bottom of the cart or carrier rests on a pair of blocks 36 secured between the sides of each of brackets 16, 18, respectively, by means of pins 38 and 40.

The blocks 36 extend downwardly from the brackets 16, 18 and support the elongate frame at its lower end when the present invention is being used as a golf carrier. These blocks 36, along with the block 88 to which further reference will be made infra, form a stable three-point support for the carrier when it is desired to set it in the vertical position illustrated in FIGS. 2, 3, and 4.

Figure 1:
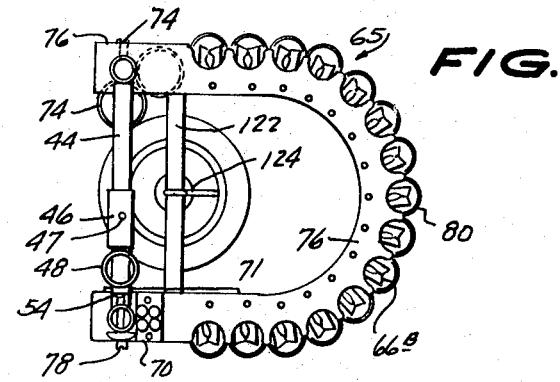
FIG. 1 is a top view looking downwardly on the golf carrier.

Referring now to FIGS. 1, 3, and 4, the tops of the frame members 10, 12 are secured together by a cross brace 44 on which a stop sleeve 46 is attached by a pin 47 adjacent one end thereof. A handle 48 is secured to an arcuate disc 50, best shown in FIG. 4, by means of pins 54. The disc 50 is provided with a plurality of apertures, shown at 56 and 58 (see FIG. 4) which are selectively engaged by a pin 60 mounted for reciprocable movement transversely on the frame member 12 and biased into aperture engaging position by a compression spring 62 and a keeper disc 64 on the end of the pin 60, best shown in FIG. 3. The handle 48 is journaled on the brace 44 and may be locked in the extended position shown in FIG. 4 or the collapsed position shown in FIGS. 2 and 3, as desired. Normally, of course, when the present invention is being used as a carrier, the handle 48 will be locked in the collapsed position shown in FIGS. 2 and 3, and when used as a cart, the handle will be extended in the manner shown in FIG. 4.

Referring now to FIG. 4, an extension member 65 is secured to the upper ends of the elongate frame members 10 and 12. The extension member 65 comprises a pair of vertically spaced substantially parallel and confronting U-shaped plates 66 and 68. To insure rigidity of construction, the spacer plates 66 and 68 at their remotely disposed ends (see FIG. 8) are secured by pins 67 to the opposed sides of spacer blocks 69. A vertical bore 66A extends through each of the blocks 69 and the plates 66, 68 to slidably receive the frame members 10 and 12 therein.

Occupying the remainder of the space between the confronting plates 66, 68 are a plurality of substantially U-shaped grippers 70 arranged in side-by-side placement. Each of the grippers 70 includes a pair of confronting jaws 70A, 70B biased into engaging relation by a coil spring 70C. The outer ends of the jaws 70A, 70B terminate at the outer peripheral edges of each of the plates 66, 68. The grippers 70 are preferably formed of wood, plastic, or hard rubber material and the jaws 70A, 70B of each gripper 70 are movable apart to engage and grip the diameter of a golf club shaft. The grippers 70 are disposed (see FIGS. 1 and 4) in registry with pairs of arcuately shaped cutouts 66B, 68B, each pair of cutouts 66B, 68B being aligned and opening into the outer peripheral edge of their respective plates 66, 68 in spaced side-by-side relationship relative to one another. The grippers 70 and springs 70C are secured in their respective positions as by the pins 71.

The remotely disposed ends of the extension 65 and spacer blocks 69 are covered by end plates 72 and a pair of side plates 74, 75. Pins 76 extend through the end plates 72 into the spacer blocks 69.

As has been stated above, the extension member 65 is slidably mounted on the frame members 10, 12, and the position of the extension member 65 relative to the frame members 10, 12 may be secured in a preselected adjusted position as by means of set screws 78 which are threaded through a nut 79 mounted in blocks 69 for engagement with the adjacent one of the frame members 10, 12. This adjustable feature is especially important since it permits the adaptation of the carrier-cart combination of this invention to ladies' clubs, smaller clubs, and for men's clubs.

While the grippers 70 have been specifically described and illustrated, other grippers conventional in the art such as, for example, metal clips or biased wooden clips may be substituted therefor to perform an analogous function providing, of course, that the substituted gripper would include an opening between the jaws thereof to permit a golf club shaft to be resiliently slipped into the central opening.

The handle ends 92 of the golf clubs are received in tubular cups 84 having a beveled top edge 85 to permit easier insertion of the ends of the handles 92 therein. Each of the cups 84 (see FIGS. 2, 4 and 6) is connected to the U-shaped portion 14 by means of a transversely extending bolt 86. The centrally located one of the cups 84 has inserted therein the upper end of a foot 88. This end of the foot 88 is fixedly connected within cup 84 by a transversely extending bolt 90. The lower end of the foot 88 projects below the lower end of cup 84 to form, along with the aforedescribed blocks 36, the three-point support described supra.

It will be understood from the several figures of the drawings, especially from FIG. 4, that the cups 84 are in alignment with the grippers 70 such that a golf club having a handle 92 and a head 94 may be secured in alignment between the respective sets of grippers 70 and cups 84. Since the cups 84 and grippers 70 are in side-by-side relation around the U-shaped extensions, a plurality of golf clubs may then be supported in such side-by-side relation in the U-shaped configuration. Further, since the golf clubs are used only one at a time, the position of a particular club, or the space for it, is always the same relative to the other clubs, and it is much easier and quicker for the user to select a particular club for use in the practice of this invention.

It is also desired to secure a plurality of tees to the carrier-cart combination of this invention. A plate 96, best shown overall in FIG. 4, and shown in detail in FIG. 7 is secured to the plate 66, which is provided with the necessary opening therein. The plate 96 is secured by means of a plurality of screws 98 and is provided with a plurality of holes 100. Each of the screws 98 secures a generally U-shaped spring clip 102 underneath the plate 96. The U-shaped clip 102 extends across the opening 100 and resiliently grips the bottom end of a tee which is inserted in the respective hole 100. Thus, when the carrier or cart is laid down the tees do not fall out. This is a simple and yet very effective and useful improvement over the tee holders of the prior art.

As is shown in FIG. 4, and also in FIG. 1, a crossbar 122 has the opposed ends thereof fixedly connected to the adjacent side plates 75 and is provided with a circumferential slot groove 124 intermediate its ends. At the bottom end of the frame, reference being made to FIGS. 2, 3, and 4, an elongated helicoidal spring 126 has its opposed ends fixedly connected to the opposed sides of the U-shaped bight portion 14 in parallel relationship relative to the crossbar 122. The crossbar 122 and the spring 126 cooperate to support a wheel assembly therebetween in the inoperative position shown in FIGS. 2 and 3. The wheel assembly comprises an axle 128 having keeper sleeves 130 and 132 thereon disposed adjacent each of its respective ends, the keeper sleeves 130, 132 being adapted to engage the adjacent confronting sides of the bracket 18 to prevent slippage of the axle in the direction of its longitudinal axis, and the assembly also includes wheels 134 and 136 which are secured for rotation on the opposed ends of the axle by conventional means. As is seen in FIGS. 2 and 4, conventional hooks 138, 140 are connected, respectively, to the opposed ends of the axle 128, and the wheel assembly is secured in its inoperative position in the frame by engaging either of the hooks 138, 140 over the crossbar 122 and in the slot or groove 124 while connecting the other of the hooks 138, 140 with the transversely extending spring 126.

In its operative position, FIG. 4, the wheel assembly is secured on the axle 128 extending laterally thereof at the lower end of the free members 10 and 12. The axle 128 is releasably secured in the upwardly extending semi-circular lobes 24' which from the inner terminal ends of each of the grooves 24 and 26 by means of the arms 28 and 30 of the spring 32. Since the lobes 24' are sloped in a generally upward direction, the weight of the cart pressing downwardly on the axle 128 holds the axle 128 and its associated wheels 134, 136 against displacement when the wheels are being used. Should the cart be lifted upwardly with the wheel assembly in place, the resilient members 28 and 30 are sufficiently strong so as to prevent the inadvertent and accidental separation of the axle and wheel assembly from the frame. These springs 28, 130 are, however, sufficiently resilient so as to permit the user to remove or insert the axle assembly easily at will.

Another important facet of this invention is the provision of golf ball containers here designated by the general reference numerals 142, 143. Each of the containers 142, 143 comprises a substantially hollow tubular member, each of which is connected adjacent its opposed ends to the frame member 10 as by strap means 144, 146. Reference numerals 148 denote a pair of curved elongated spring members, each of which has one of its respective ends connected by means of pin or bolt 150 to the frame member 10. The free end of each of the spring members 148 extends over and into the upper end of one of the tubular members 142, 143. The construction is such that the springs 148 will flex to permit the passage downwardly of golf balls into a selected one of the ball containers but prevent the passage of golf balls through the adjacent end of the containers in the reverse direction.

At the other ends of each of the tubular members 142, 143 there is provided one or more resilient golf ball keeper springs 152, 154. These keeper springs extend far enough below the adjacent end of their respective tubular members to expose a single golf ball and are of sufficient strength as to prevent the golf ball from falling of its own weight through the keeper springs 152, 154. The springs 152, 154 are also possessed of sufficient strength so as not to permit the inadvertent release of the lowermost one of the golf balls in either of the containers 142, 143 under the accumulated weight of a number of golf balls disposed therein. The resilient springs 152 and 154 are, however, sufficiently pliable as to permit the user to grasp the lowermost one of the golf balls retained therebetween for removal and play. To utilize the containers 142, 143 it is only necessary for the user to insert golf balls through the open tops thereof by displacing the spring 148, and to remove each individually from the bottom of their respective containers by displacing the springs 152, 154. No snaps, buckles, buttons, or the like are required, the user needing only to exert slight strength to effect the separation of the springs 153, 154 for the removal of one or more golf balls. The containers 142, 143 are provided primarily for the purpose of separating new golf balls from used golf balls, thereby enabling the user to select a new or used ball at his pleasure and without the necessity of fumbling through a receptacle for the desired ball as is now commonly the practice with conventional and well known golf bags.

Figure 9:
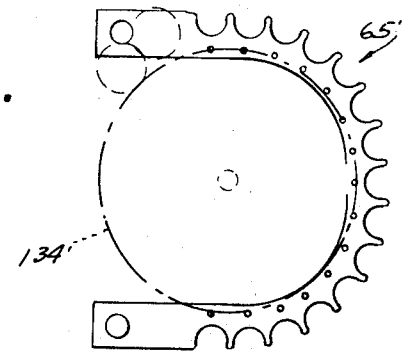

FIG. 9 illustrates a modified form of the extension member 65. In this construction the extension member is identified by reference numeral 65' and with but one exception, the construction of the two extension members 65, 65' are identical, one with respect to the other. The single exception resides in forming the U-shaped member 65' with a radius of curvature throughout the bight portion thereof which is greater than the radius of curvature of the corresponding portion of the member 65. It will be understood that the U-shaped member 14 would be correspondingly modified. Through using this modified form of the invention certain advantages are obtained since larger wheels 134' (as shown in dotted lines in FIG. 9) may be employed and the construction becomes more stable when set on the blocks 36, 40 and 88. Greater stability is also obtained through this construction when the device is disposed in its horizontal position and is supported on the blocks 36, 40 and the plate assembly 72.

The constructon of this carrier is further enhanced, if desired, through the provision of vertically spaced transverse inspection openings 200 formed in each of the containers 142, 143. These openings provide the user with means for determining the exact number of golf balls 202 in each of the containers 142, 143. For convenience, ball number indicating means may be provided adjacent each of the side openings 200.

It will be seen from the foregoing description that a carrier which may be converted to a cart has been disclosed together with novel golf club holding, golf ball holding and golf tee holding means in the combination. It will be understood, however, that departures may be made from the actual construction disclosed and illustrated herein without departing from the spirit and scope of the invention as defined in the appended claims.

What is claimed is:
1. A convertible golfing accessory comprising, in combination:
an elongate frame;
a first frame extension secured adjacent one end of the elongate frame;
a plurality of engaging means on the first frame extension for individually receiving an end of a plurality of golf clubs;
axle receiving means secured adjacent said end of said frame for removably receiving an axle therein;
a second frame extension secured proximate the other end of the elongate frame;
a plurality of support means secured to said second frame extension for individually supporting the handle of a plurality of golf clubs, said support means and said engaging means being so constructed and relatively disposed as to cooperatively secure a plurality of golf clubs adjacent said extensions in side-by-side relation;
a wheel assembly including an axle mounted in said axle receiving means;
said axle receiving means including:
at least two brackets secured in spaced transverse relation to the frame, each of said brackets being provided with a slot terminating at its inner end in an upwardly extending semi-circular lobe and further including resilient retaining members individually having a free end extending such that when the axle is received in the slots the retaining members individually resiliently bias the axle upwardly for holding the wheel assembly in position in said receiving means.

2. The golfing accessory of claim 1 wherein:
the frame comprises a pair of substantially parallel elongate members secured in spaced relation;
the first extension comprises a generally curved member secured at the ends thereof adjacent the ends of the respective elongate members, said golf club engaging means being disposed along the curved member and secured thereto in curved configuration; and the second extension comprises a curved construction which includes said support means, said curved construction being secured at the ends thereof to the respective elongate members and being so constructed as to dispose the support means in aligned relationship with the golf club engaging means.

3. The golfing accessory of claim 1 which includes:

means for selectively securing said wheel assembly in said frame longitudinally thereof to permit said frame to be used as a golf bag, said wheel assembly being removable from said wheel assembly securing means for being received in said axle receiving means, said axle receiving means being so disposed and constructed as to secure the wheel assembly with the axle transversely of the frame for forming a golf cart;

with said means for selectively securing the wheel assembly in the frame comprising a crossbar secured proximate the other end of the elongate frame and transversely thereof, an elongate resilient member secured transversely of the frame proximate the one end of the frame; and further comprising a hook secured at each end of the axle, said hooks being constructed for respectively engaging the crossbar and the elongate resilient member for suspending the wheel assembly therebetween.

4. The golfing accessory of claim 3 further comprising:

a handle pivotally secured to the frame adjacent the other end thereof;

a disc secured to the handle, said disc having a plurality of apertures spaced from each other on an arc having the center curvature coinciding with the pivot point of the handle; and a resiliently biased pin secured to the frame for selectively being received in selected apertures in the disc for fixing the position of the handle.

5. The golfing accessory of claim 1 further comprising:

a handle pivotally secured to the frame adjacent the other end thereof;

a disc secured to the handle, said disc having a plurality of apertures spaced from each other on an arc having the center curvature coinciding with the pivot point of the handle; and a resiliently biased pin secured to the frame for selectively being received in selected apertures in the disc for fixing the position of the handle.

6. The golfing accessory of claim 1 wherein:

the second frame extension comprises a pair of curved plates secured in generally parallel spaced relation and being provided with a plurality of slots for receiving golf club shafts; and the support means individually comprise resilient grippers each having an opening therein, said grippers being secured between the curved plates such that the openings therein are aligned with the slots in the curved plates, said openings being formed to receive and resiliently clamp individual golf club shafts therein.

7. A convertible golfing accessory comprising, in combination:

an elongate frame;

a first frame extension secured adjacent one end of the elongate frame;

a plurality of engaging means on the first frame extension for individually receiving an end of a plurality of golf clubs;

axle receiving means secured adjacent said end of said frame for removably receiving an axle therein;

a second frame extension secured proximate the other end of the elongate frame;

a plurality of support means secured to said second frame extension for individually supporting the handle of a plurality of golf clubs, said support means and said engaging means being so constructed and relatively disposed as to cooperatively secure a plurality of golf clubs adjacent said extensions in side-by-side relation;

a wheel assembly including an axle;

means for selectively securing said wheel assembly in said frame longitudinally thereof to permit said frame to be used as a golf bag, said wheel assembly being removable from said wheel assembly securing means for being received in said axle receiving means, said axle receiving means being so disposed and constructed as to secure the wheel assembly with the axle transversely of the frame for forming a golf cart;

the means for selectively securing the wheel assembly in the frame comprises a crossbar secured proximate the other end of the elongate frame and transversely thereof and an elongate resilient member secured transversely of the frame proximate the one end of the frame; and further comprising a hook secured at each end of the axle, said hooks being constructed for respectively engaging the crossbar and the elongate resilient member for suspending the wheel assembly therebetween.

8. The golfing accessory of claim 7 wherein:

the frame comprises a pair of substantially parallel elongate members secured in spaced relation;

the first extension comprises a generally curved member secured at the ends thereof adjacent the ends of the respective elongate members, said golf club engaging means being disposed along the curved member and secured thereto in curved configuration; and the second extension comprises a curved construction which includes said support means, said curved construction being secured at the ends thereof to the respective elongate members and being so constructed as to dispose the support means in aligned relationship with the golf club engaging means.

9. The golfing accessory of claim 7 further comprising:

a handle pivotally secured to the frame adjacent the other end thereof;

a disc secured to the handle, said disc having a plurality of apertures spaced from each other on an arc having the center curvature coinciding with the pivot point of the handle; and a resiliently biased pin secured to the frame for selectively being received in selected apertures in the disc for fixing the position of the handle.

10. A convertible golfing accessory comprising, in combination:

an elongate frame;

a first frame extension secured adjacent one end of the elongate frame;

a plurality of engaging means on the first frame extension for individually receiving an end of a plurality of golf clubs;

axle receiving means secured adjacent said end of said frame for removably receiving an axle therein;

a second frame extension secured proximate the other end of the elongate frame;

a plurality of support means secured to said second frame extension for individually supporting the handle of a plurality of golf clubs, said support means and said engaging means being so constructed and relative disposed as to cooperatively secure a plurality of golf clubs adjacent said extensions in side-by-side relation; and a wheel assembly including an axle mounted in said axle receiving means;

a handle pivotally secured to the frame adjacent the other end thereof;

a disc secured to the handle, said disc having a plurality of apertures spaced from each other on an arc having a center of curvature coinciding with the pivot point of the handle; and a resiliently biased pin secured to the frame for selectively being received in selected apertures in the disc for fixing the position of the handle.

References Cited

UNITED STATES PATENTS 2,024,484  12/1935  Smith.
2,590,178   3/1952  Jamison.
2,676,710   4/1954  Williamson.
3,128,021   4/1964  Habbena _____ 211—14 X
3,014,760  12/1961  Gard.
3,154,314  10/1964  McCune.

LEO FRIAGLIA, Primary Examiner

J. A. PEKAR, Assistant Examiner

U.S. Cl. X.R.

280—47.19